Sept. 23, 1941.  W. SIMONTON  2,256,966
COMBINED SUNGLASS AND EYE SHADE
Filed Dec. 12, 1940
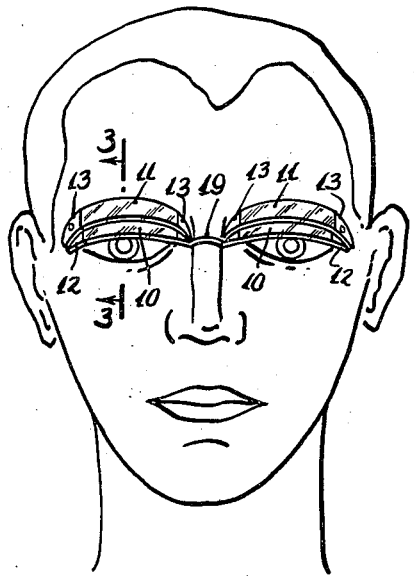
Fig. 1.
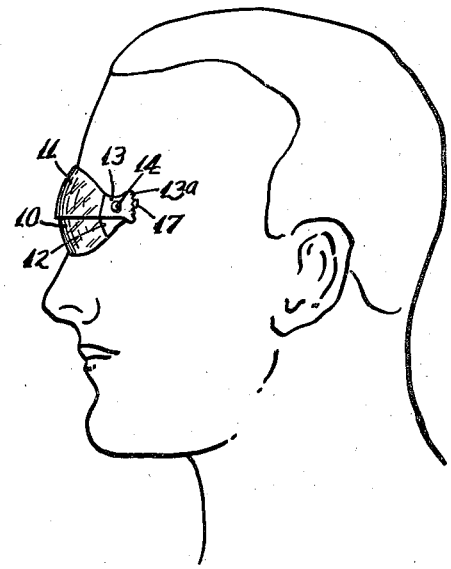
Fig. 2.
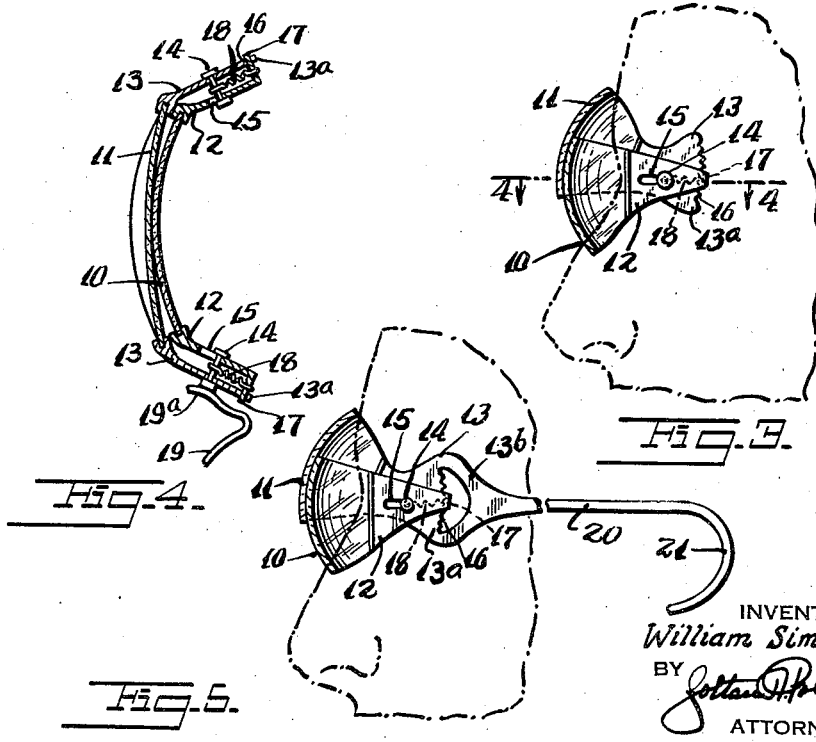
Fig. 3.
Fig. 4.
Fig. 5.
INVENTOR
William Simonton
BY
ATTORNEY Patented Sept. 23, 1941

2,256,966

UNITED STATES PATENT OFFICE 2,256,966

COMBINED SUNGLASS AND EYE SHADE

William Simonton, New York, N. Y.

Application December 12, 1940, Serial No. 369,696

4 Claims. (Cl. 2—12)

This invention relates to new and useful improvements in a combined sun glass and eye shade.

More specifically the invention proposes the construction of a sun glass and shade combination characterized by a pincher type nose bridge or a temple bar attachment for fixedly engaging one's nose or ears, etc., and carrying a pair of sun glass sections for engaging across the bottom area of one's eyes in a manner to permit the sun glass sections to be used in a manner similar to all sun glasses and simultaneously protect the eyes from dust by completely surrounding the eyes with the combined sun glass and eye shade.

Still further the invention proposes the application of opaque shade sections for extending across the top area of the eyes and in face adjacency with said sun glass sections in a manner to protect one's eyes against bright sunlight or other bright lights.

Still further it is proposed to provide pintle pins mounted upon the end portions of the said sections and arranged in a manner to permit the sections to be moved into various pivoted positions, with relation to each other in a manner to permit the sun glass to be moved into an operative or inoperative position.

Still further it is proposed to provide a resilient means acting between the pintle pins and portions of said sections for urging the sections into position in which they will maintain their adjustments.

A further object of this invention is the construction of a sun glass and eye shade combination as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a front elevational view of a sun glass and eye shade combination constructed in accordance with this invention and shown in position on one's face.

Fig. 2 is a side elevational view of Fig. 1.

Fig. 3 is a vertical sectional view on the line 3—3 of Fig. 1.

Fig. 4 is a horizontal sectional view on the line 4—4 of Fig. 3.

Fig. 5 is a similar view to Fig. 3 but illustrating another form of the invention.

The sun glass and shade combination, according to this invention includes sun glass sections 10 for extending across the bottom area of one's eyes. These sun glass sections 10 are preferably constructed of a suitable transparent material capable of being used as a sun glass or ground to optical prescriptions for the purpose of permitting the same to be used in the conventional manner similar to all sun glasses. A shade section 11 is provided for each of the sun glass sections 10 and is arranged to be extended across the top area of one's eyes and in face adjacency with its respective sun glass section. These shade sections 11 are preferably constructed of Celluloid, plastic, or other similar translucent materials and and arranged for the purpose of shielding one's eyes against brilliant sunlight or other artificial lights when used indoors. The end portions of the sun glass sections 10 are provided with metallic ends 12 and the shade sections 11 are likewise provided at their ends with metallic end portions 13.

Means is extended through the metallic end portions 12 and 13 for pivotally connecting the sun glass sections 10 and their respective shade sections 11 together in a manner to permit the same to be moved relative to each other to bring the sun glass sections 10 into and out of operative positions with relation to the shade sections 11. This means comprises a pintle pin 14 which is fixedly mounted on the end portion of one of the sections and which engages through a slot 15 in the other of the sections. It is preferred that the pintle pins 14 be fixedly connected with the end portions 13 of the shade sections 11 and engage through the slots 15 formed in the end portions 12 of the sun glass sections 10.

A means is provided for holding the sections against pivoting about the pintle pin 14 and comprises a fan-shaped end 13$^a$ formed upon the projecting portions of the metallic end portions 13. Each of these fan-shaped ends is provided with a plurality of serrations 16 arcuately and concentrically formed with relation to the pintle pin 14. The other metallic end section 12 has its end bent at right angles thereto forming a tail 17 which is adapted to be engaged with the serrations 16 for the purpose of holding the sections against pivoting.

A resilient means is provided for urging the sections into a position in which the tail 17 will be engaged with one of the serrations 16 of the fan tail 13$^a$. This means comprises a spring 18 which operates between the pintle pin 14 and the tail 17 for urging the tail 17 into a position in which it will engage one of the serrations 16. A means is provided for connecting together the adjacent lenses and for supporting the entire device upon one's nose. This means comprises a pincher type nose bridge 19 which has its outwardly extending finger portions 19a securely attached to the adjacent ends of the pintle pin 14 mounted on the adjacent inner ends of the sections 10 and 11. In use the finger portions 19a are adapted to be urged together for spreading the nose bridge 19 to permit the same to be engaged upon one's nose for fixedly holding the sun glass in position thereon.

The operation of this invention is as follows:

Let us assume that the device is in a proper position upon one's nose with the shade sections 11 moved to their inoperative positions. If it is desired to move the shade sections 11 into their face adjacency with the sun glass section 10, it is merely necessary to remove the device from one's nose, urge the sun shade sections 10 out of their normal position against the holding action of the springs 18 as permitted by the slot 15. This will cause the tail 17 to be disengaged from its respective serrations 16, freeing the lens 10 and 11 to be pivoted with relation to each other. The shade sections 11 are then moved downwards across the face of the sun shade sections 10 and this section is again released, permitting springs 18 to urge the sun shade sections 10 into face adjacency with the shade sections 11. This will also cause the tail 17 to be engaged with its adjacent serration 16 for holding the sun shade sections 10 and the shade sections 11 in their newly adjusted position in which the shade sections 11 will act to protect one's eyes against brilliant sunlight or other similar artificial lights.

In Fig. 5, each eye shade section 11 is illustrated with a temple support 20. One side of this temple support 20 is attached to the loop extension 13b of the fan-shaped member 13. The free end 21 of the temple 20 is curved in the usual manner to form an anchoring means around the ear. By means of this arrangement, the sun shade sections 11 are held fixedly by the temple supports 20, while the sun glass sections 10 may be raised and lowered at will.

This combined sun glass and eye shade may be used by sportsmen, gardeners, or outdoor workers, also by those who work under glaring illuminating conditions.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A sun glass and eye shade combination comprising a sun glass section for extending across the bottom area of the eye, a shade section for extending across the top area of said eye and in face adjacency with said sun glass section, pintle pins mounted through the end portions of one of said sections and engaging through slots in the other of said sections, and resilient means acting between said pintle pins and the slotted section for urging the sections into engagement with each other to hold them in various relative pivoted positions.

2. A sun glass and eye shade combination comprising a sun glass section for extending across the bottom area of the eye, a shade section for extending across the top area of said eye and in face adjacency with said sun glass section, pintle pins mounted through the end portions of one of said sections and engaging through slots in the other of said sections, and resilient means acting between said pintle pins and the slotted section for urging the sections into engagement with each other to hold them in various relative pivoted positions, said sections being provided with metallic ends and said pintle pins being engaged through said metallic ends.

3. A sun glass and eye shade combination comprising a sun glass section for extending across the bottom area of the eye, a shade section for extending across the top area of said eye and in face adjacency with said sun glass section, pintle pins mounted through the end portions of one of said sections and engaging through slots in the other of said sections, and resilient means acting between said pintle pins and the slotted section for urging the sections into engagement with each other to hold them in various relative pivoted positions, said resilient means comprising springs.

4. A sun glass and eye shade combination comprising a sun glass section for extending across the bottom area of the eye, a shade section for extending across the top area of said eye and in face adjacency with said sun glass section, pintle pins mounted through the end portions of one of said sections and engaging through slots in the other of said sections, and resilient means acting between said pintle pins and the slotted section for urging the sections into engagement with each other to hold them in various relative pivoted positions, said sections being provided with metallic ends and said pintle pins being engaged through said metallic ends, and means for holding said sections against pivoting when urged into their face adjacency by said resilient means, said means comprising a fan tail formed on one of said metallic ends and having serrations, a right angular tail formed on the other of said metallic end sections and selectively engageable with the serrations of said fan tail.

WILLIAM SIMONTON.